United States Patent [19]
Hoffman et al.

[11] 3,760,380
[45] Sept. 18, 1973

[54] SILICON GATE COMPLEMENTARY MOS DYNAMIC RAM

[75] Inventors: Charles R. Hoffman, Tempe; William W. Lattin, Phoenix, both of Ariz.

[73] Assignee: Motorola, Inc., Franklin Park, Ill.

[22] Filed: June 2, 1972

[21] Appl. No.: 259,216

[52] U.S. Cl. ............ 340/173 R, 307/238, 307/279, 307/313, 340/173 CA
[51] Int. Cl. ..... G11c 11/24, G11c 5/00, G11c 7/00
[58] Field of Search ..................... 340/173 R, 172.5, 340/173 CA; 307/205, 238, 251, 279, 288, 313

[56] References Cited

UNITED STATES PATENTS

| | | | |
|---|---|---|---|
| 3,521,242 | 5/1970 | Katz | 340/173 R |
| 3,588,848 | 6/1971 | Van Beek | 340/173 R |

OTHER PUBLICATIONS

Hoff Jr., Silicon-Gate Dynamic MOS Grams 1,024 Bits on a Chip, 8/3/70, Electronics, pp. 68–73.

*Primary Examiner*—Bernard Konick
*Assistant Examiner*—Stuart Hecker
*Attorney*—Vincent J. Rauner et al.

[57] ABSTRACT

A monolithic integrated circuit random access memory system having a storage matrix of silicon gate MOS N-channel dynamic RAM cells interfaced with silicon gate complementary MOS addressing circuitry, requiring no diffused guard rings, and input-output circuitry. Dynamic N-channel RAM cells are used to provide very high density storage of binary data in the relatively large storage matrix, and complementary silicon gate low threshold MOS circuitry is used to implement the peripheral circuitry including the address decoding sections, refresh circuitry, and input-output section to provide extremely low power dissipation, high speed operation, low sensitivity to device parameter variations, high noise immunity, and efficient operation over a wide range of power supply voltages.

14 Claims, 9 Drawing Figures

SILICON GATE COMPLEMENTARY MOS DYNAMIC RAM

BACKGROUND OF THE INVENTION

This invention relates generally to semiconductor memory systems, and specifically to monolithic integrated circuit dynamic random access memory (RAM) systems using enhancement mode field effect transistors. Monolithic MOS integrated circuit memory systems typically include a large rectangular storage matrix arranged as $2^M$ rows by $2^N$ columns of storage cells. Several basic MOS manufacturing processes have achieved commercial success to date, one being known as the metal gate MOS process and another as the silicon gate MOS process. In prior art silicon gate MOS RAM circuits all of the MOS transistors on a chip having static circuitry, dynamic circuitry, or both have been of a single channel type, that is, all N-channel or all P-channel. For peripheral circuitry of either a P-channel system or an N-channel system of dynamic peripheral circuitry there are inherent disadvantages in achieving satisfactorily high "1" voltage levels due to the threshold voltage drop of clocked MOS load devices, which must charge node capacitances to the desired 1 level. Consequently, prior art dynamic RAM systems have required power supply voltages of the order of 15 to 20 volts. Due to the possibility in conventional dynamic MOS circuitry of capacitively coupling circuit nodes having P-type diffusions connected thereto and temporarily storing voltage levels thereon in a manner which forward biases the associated P-N junction and thereby injects minority carries into the substrate, which may then be collected by bipolar transistor action by storage nodes of any RAM cell in the array, it has been necessary to provide a separate power supply terminal to the substrate. This additional substrate terminal has been used to ensure reverse biasing of all PN junctions in the circuit, and reduces the packaging efficiency of the memory system, and places additional requirements on the user. A related technology which has been used for low complexity integrated circuits is the metal gate complementary MOS (CMOS) technology. However, the density of CMOS circuitry achievable with present technology is far less than that of comparably complex P-channel or N-channel MOS logic circuitry. This is because the CMOS substrate must have relatively deep P-type diffusions to provide "tubs" into which N-channel diffusions are made, thereby forming the sources and drains of N-channel MOS transistors. Also because of difficulties of obtaining compatible doping levels for the P-type diffusion and the N-type diffusions, metal gate CMOS integrated circuits have had severe field inversion problems which give rise to parasitic P-channel and N-channel transistors, which degrade circuit performance. It has been the practice, therefore, to diffuse N-type guard rings around P-channel transistors and P-type guard rings around N-channel transistors to block the parasitic current paths. The large amount of additional chip area required for such guard rings and for the P-type tubs, necessitates use of much more chip area per digital logic function for circuits built using the CMOS technology than for comparable complexity circuits using P-channel or N-channel MOS technology. For the above-mentioned reasons, the metal gate CMOS technology has not been used to fabricate high-density integrated circuits, especially RAMs.

In general, both N-channel or P-channel prior art dynamic MOS RAM chips have had the disadvantages of relatively high power dissipation, degradation of storage data due to various parasitic complex peripheral circuit designs, high sensitivity to manufacturing process parameters, low noise immunity, high sensitivity to power supply variations, and requiring an additional power supply terminal. Prior art metal gate CMPS RAMs have been economically unfeasible because of the low component density achievable for that manufacturing process. The present invention solves those problems by providing an improved, economically feasible monolithic Random Access Memory chip which operates at higher speed and at lower power (nearly zero DC power) than any prior monolithic RAM.

SUMMARY OF THE INVENTION

In the present invention shortcomings of the prior art MOS and complementary MOS (CMOS) random access memories (RAMs) are overcome by providing a monolithic CMOS RAM having complementary peripheral circuitry in combination with a storage array comprised of N-channel dynamic storage cells, wherein the monolithic chip is fabricated using an improved silicon gate CMOS manufacturing process. In the improved silicon gate CMOS process the threshold voltages for both P-channel and N-channel transistors are very low, typically less than one volt, and the parasitic field inversion threshold voltages are typically greater than 10 volts, so that diffused guard rings are nt required for either P-channel or N-channel transistors.

According to the present invention, the application of static and dynamic circuit design technique are combined with the above-described improved CMOS manufacturing process to provide a RAM chip having the greatest degree of optimization yet possible with respect to the following design variables: number of RAM cells in the storage array, amount of chip area required by peripheral circuitry, power dissipation of the chip, speed of operation, noise immunity, circuit insensitivity to process parameters, power supply voltage range and number of power supplies required.

The storage array is arranged on the chip as $2^M$ rows by $2^N$ columns of N-channel dynamic storage cells which accomplish the data storage function in a minimum amount of chip area, thereby permitting the maximum number of bits per chip. The use of N-channel rather than P-channel transistors in the storage array provides increased RAM cell current drive and therefore greater operating speed. The peripheral circuitry includes address inverters, decode gates, input-output circuits, internal precharge circuits and refresh circuits all utilizing complementary MOS (CMOS) circuit design techniques to provide microwatt DC power dissipation, high noise immunity, high speed decoding and accessing of the selected RAM cell, and minimum sensitivity to process parameters. A single precharge clock input is required.

The concept of implementing a RAM such as the one described hereinbefore using prior art CMOS manufacturing processes is not economically feasible for a number of compelling reasons, the most important being the much lower density of RAM cells and peripheral circuits that is achievable thereby. Further, the higher threshold voltages (typically 2 volts) of prior art CMOS manufacturing processes necessitate the use of higher power supply voltages, leading to more complex address inverter-buffer circuits, and greater AC power dissipation, and increased overall system cost.

In view of the foregoing considerations, it is an object of this invention to provide an improved monolithic random access memory array having increased operating speed, lower power dissipation, lower sensitivity to process parameter variations, lower operating sensitivity to power supply variations, and a lower number of power supplies than prior art MOS dynamic random access memories.

It is another object of this invention to provide a monolithic dynaimc random access memory having a storage array comprised of N-channel three transistor dynamic RAM cells, the storage array being interfaced with silicon gate CMOS row addressing circuitry and column addressing circuitry, CMOS input-output circuitry, and CMOS refresh circuitry, and being manufactured with an improved CMOS process, wherein no diffused guard rings are used Further objects and advantages of the invention will be understood from the following complete description of preferred embodiments thereof and from the drawings.

DESCRIPTION OF THE INVENTION

Figure 1:
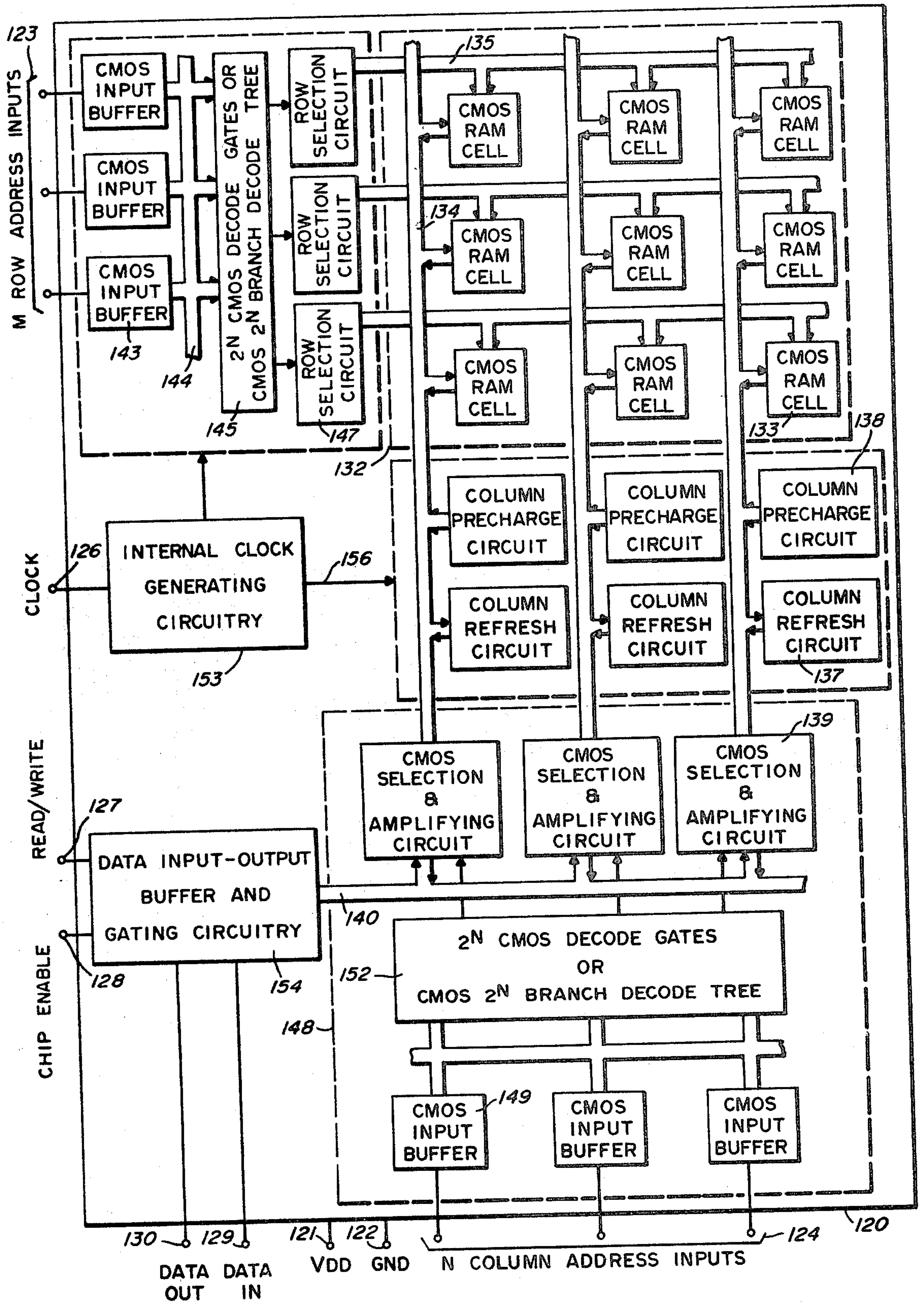
FIG. 1 is a detailed block diagram showing the structure and organization of a monolithic dynamic random access memory constructed according to the teaching of the invention.

FIG. 1 is a detailed block diagram of the circuitry of a monolithic semiconductor RAM constructed according to the present invention, wherein improved silicon gate manufacturing processes, as described hereinbefore are utilized in the fabrication of the RAM. The monolithic memory die 120 includes a storage array 132 of $2^M$ rows by $2^N$ columns, a row addressing section, a column addressing section 148, an internal clock generation section 153, and a data input-output buffer section 154. It should be noted that only a partial section (3 columns and 3 rows) of the storage array 132 is shown, and that the size of this section and the other sections as drawn in FIG. 2 are not representative of the actual relative sizes. The storage array 132 also includes control bussing means 135 and data bussing means 134. These bussing means are common to the control terminals of all storage cells in a given row and all data terminals of the cells in a given column, respectively. The control bussing means are doped polycrystalline silicon lines and the data bussing means are metal lines for the improved silicon gate CMOS process used to fabricate the subject memory chip. Common to the data bussing means 134 of each column of RAM cells 133 are the column refresh circuits 137 and the column precharge circuits 138. Each column precharge circuit 138 consists of CMOS circuitry connected to each data bus comprised by data bussing means 134, connected to establish desired voltage levels on each data bus line prior to selection of a given row of RAM cells 133 by operation of control bussing means 135. CMOS circuitry comprised by precharge circuits 138 is driven by internal clock voltages generated by internal clock generating circuitry 153. Also connected to data bussing means 134 for each column is a CMOS column refresh circuit 137 which provides temporary storage, and feedback of stored data to the selected RAM cell. Thus, by virtue of the action of the column refresh circuits for each column in the storage array, all RAM cells in the storage array may have their stored logic levels refreshed by successively selecting each row in the storage array. The control bussing means 135 for each row of the storage array 132 is driven by a separate row selection circuit 147, which has as an input one of the $2^M$ outputs of the CMOS row decode means 145. The row select circuit 147 also has as an input one or more signals generated by the internal clock generating circuitry 153. The function of the row selection means 147 is to generate the signals on the control bus lines comprised by the control bussing means 135 which are required by the dynamic memory cells 133. Each of the M row address input terminals 123 are connected to the inputs of a separate CMOS row address input buffer 143 which generates signals for row address and row address complement lines comprised by the row address bussing means 144, adequate to drive the inputs of the CMOS row decode means 145. The CMOS row decode circuitry 145 comprises $2^M$ CMOS logic gates. The output lines of the row decode circuitry 145 each are uniquely selected by a specific combination of input logic levels of the row address input terminals 123, thereby selecting one of the $2^M$ row selection circuits 147, which in turn generates the necessary signal control bussing means 135, and thereby functionally selecting one and only one row of RAM cells of the storage array 132. The column addressing section 148 includes CMOS selection and amplifying circuits 139, one for each column of the array 132, decoded column bussing means 140, which includes a decoded data line corresponding to each data bus line comprised by the data bussing means 134. Also included in the section 148 are CMOS input buffers 149, and column address bussing means 150 comprising internal address and address complement lines for the 2N column decode circuits 152. A function of CMOS selection and amplifying circuits 139 is to provide a means of transferring data between data bussing means 134 and decoded column bussing means 140 and thereby permit flow of data between data input-output buffer circuit 154 and the selected column. During a memory cycle, one of the $2^N$ outputs of the column decode circuitry 152 will have thereon a logical 1 level, and all other outputs will have a logical 0 level. The output having a 1 level will select the corresponding selection and amplifying circuit 139. Another function of selection and amplifying circuit 139 is to amplify a data signal on data bussing means 134 (driven by the selected RAM cell) and provide the corresponding amplified data level of the desired polarity onto decoded column bussing means 140 and transmit this signal to the data input-output buffer circuit 154. The data input-output buffer circuit 154 includes as inputs data in terminal 129, data out terminal 130, and chip enable terminal 128 and read/write terminal 127. Chip enable input 128 completely isolates data output terminal 130 and data input terminal 129 from decoded column bussing means 140. This feature allows bussing of data output lines and data input lines of a number of monolithic dynamic RAM systems 120 in parallel, so that chip enable input 128 of the selected chip will allow transmission of digital data between the bussed external data lines and the storage cells of the selected row and column of the selected chip. The column decoding circuitry 152 may be similar to that described for the row decode circuitry 145.

Of course, it will be obvious to those skilled in the art that the monolithic CMOS RAM of the present invention is commerically feasible because of improvements in CMOS manufacturing processes, especially those improvements which (1) permit elimination of diffused guard rings around P-channel and N-channel devices, thereby greatly increasing the component density on a monolithic chip, (2) reduce the threshold voltages of P-channel and N-channel transistors, thereby reducing the power supply voltage required for high-speed operation, and greatly reducing dynamic power dissipation.

It will be further appreciated by those skilled in the art that the structure and teachings of the present invention may be feasibly applied to the design of dynamic complementary MOS RAM fabricated by means of certain other CMOS manufacturing processes not described hereinbefore, especially those utilizing silicon on insulating substrates, for example Spinel or Saphire, or $S_iO_2$ on polycrystalline silicon, whereon self-aligning MOS transistors, either silicon gate or metal gate, are fabricated. The very low parasitic capacitance of devices fabricated using such manufacturing processes provides CMOS RAMs with excellent circuit performance.

Figure 2A:
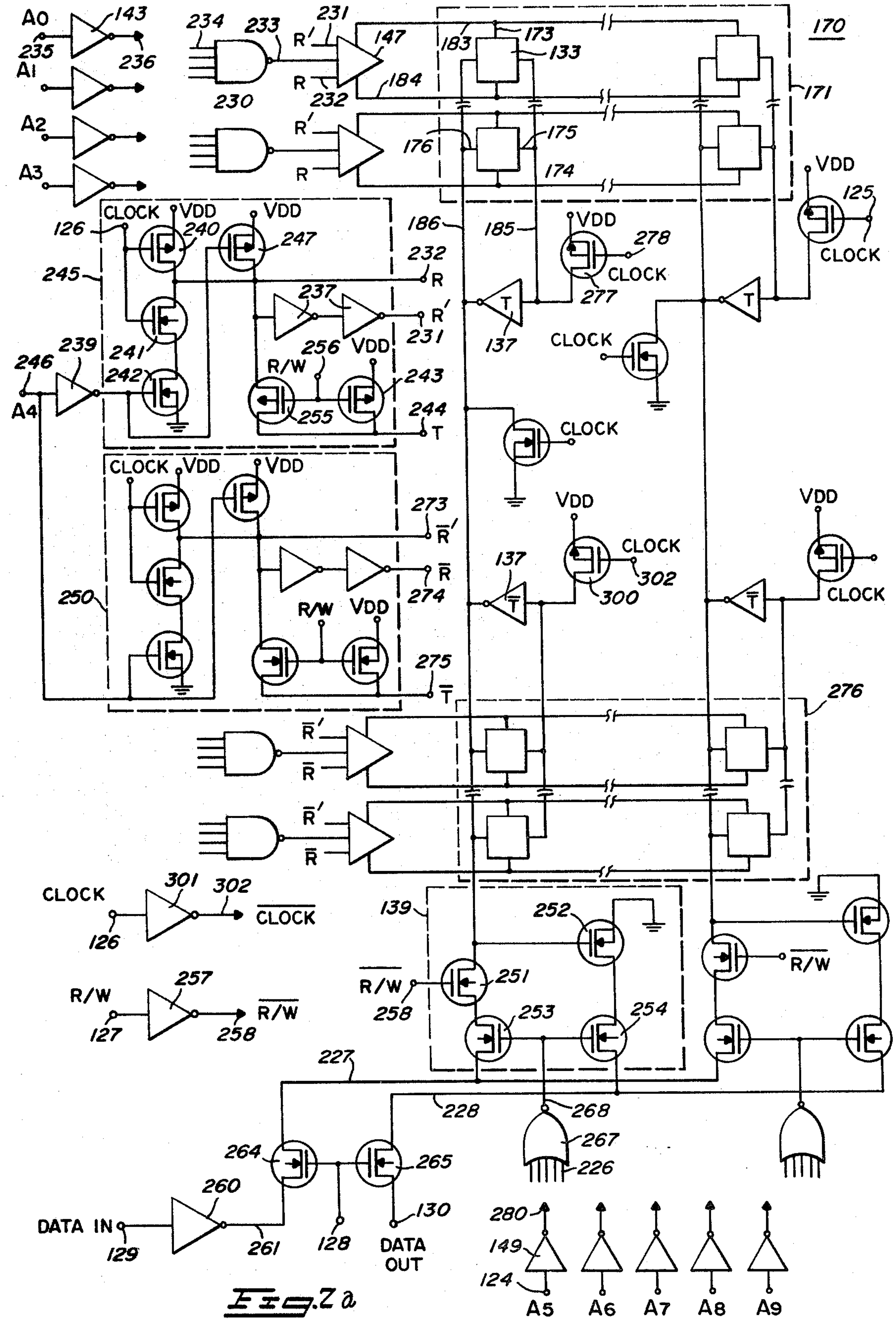
FIG. 2*a* is a schematic diagram of an embodiment of the invention.
Figures 2B, 2C:
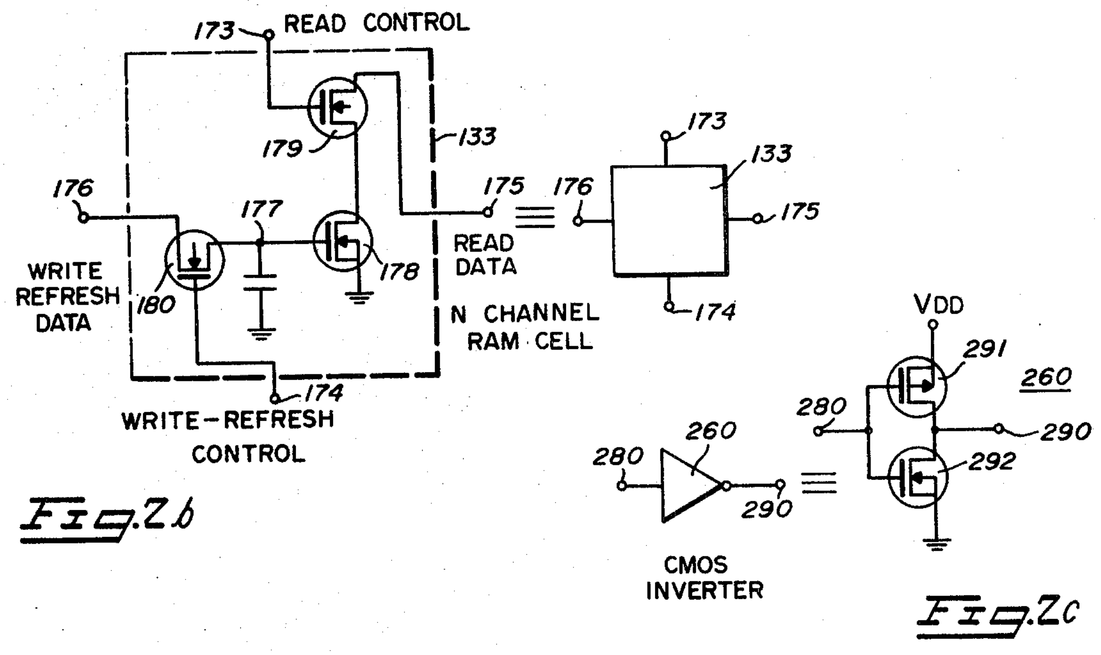
FIG. 2*b* is a schematic diagram of a *n*-channel RAM cell in the embodiment of FIG. 2*a*.
FIG. 2*c* is a schematic diagram of a CMOS inverter utilized the embodiment of FIG. 2*a*.
Figure 2D:
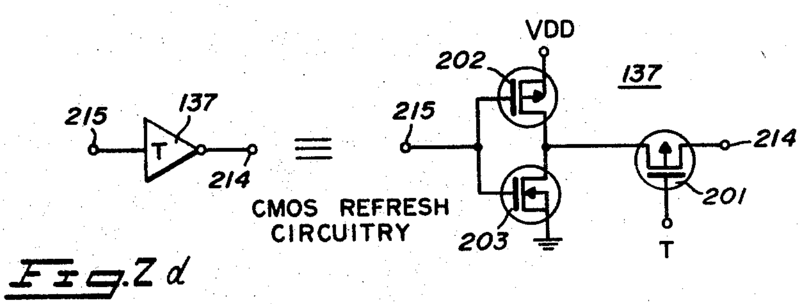
FIG. 2*d* is a schematic diagram of CMOS refresh circuitry utilized in the embodiment of FIG. 2*a*.
Figure 2E:
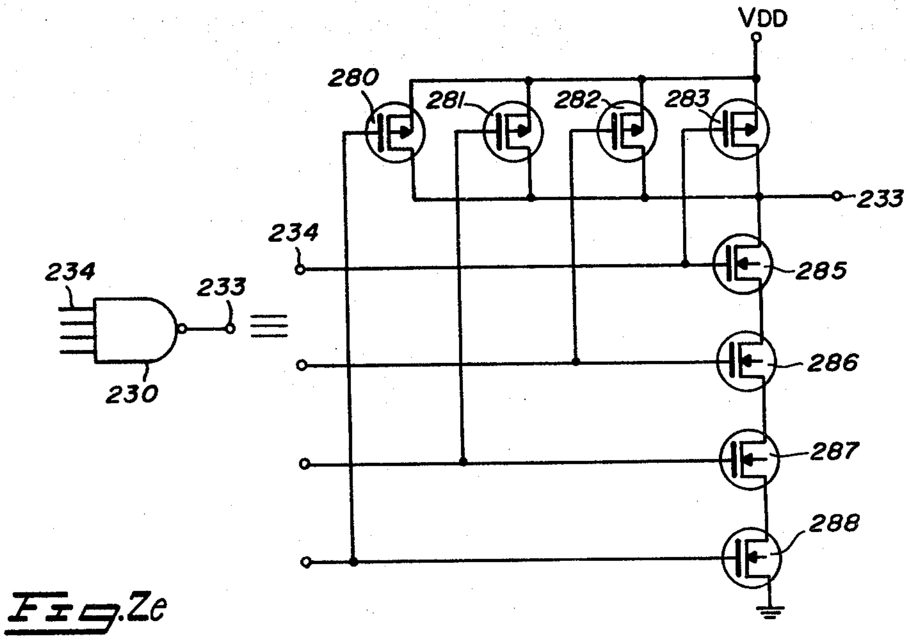
FIG. 2*e* is a schematic diagram of a NAND gate utilized in the embodiment of FIG. 2*a*.
Figure 2F:
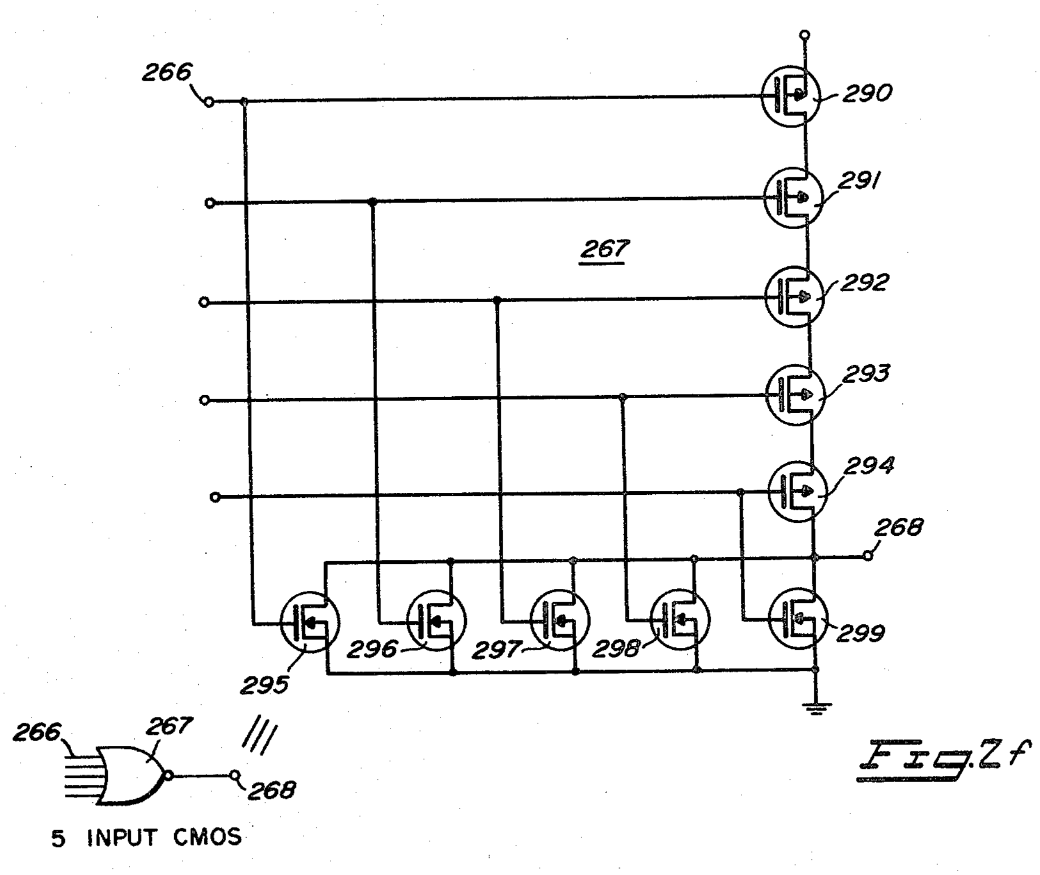
FIG. 2*f* is a CMOS NOR gate utilized in the embodiment of FIG. 2*a*.

FIGS. 2A through 2G are circuit schematics of a 1,024 bit silicon gate CMOS dynamic RAM having an N-channel storage array and constructed according to the teachings of the present invention. In FIG. 2A, the storage array is subdidivided into an upper half array 171 and a lower half array 276, each being arranged as 16 rows and 32 columns of N-channel dynamic MOS storage cells 133. Thus, the entire storage array, including both upper and lower halves, comprises 1024 random access memory cells arranged as 32 rows and 32 columns. The N-channel dynamic RAM cell 133 is shown schematically in FIG. 2B, and is comprised of three N-channel MOS transistors. (MOS transistors have three accessible electrodes, including two main electrodes and a gate electrode. The main electrodes are the source electrode and the drain electrode, respectively. Integrated circuit MOS transistors are bilateral devices, and either main electrode may function as a source or drain, depending on the relative voltages thereon. N-channel storage transistor 178 (FIG. 2B) has its source electrode connected to ground, its drain electrode connected to a main electrode of N-channel transistor 179, and its gate electrode connected to a main electrode of n-channel device 180. The gate electrode 177 of transistor 178 serves as the storage node of the N-channel RAM cell 172. Transistor 180 is a write-refresh gating device, and has its gate electrode connected to a write-refresh control terminal 174, and its other main electrode connected to a write-refresh data terminal 176. During operation of the cell, a voltage level on terminal 176 is transferred to storage node 177 when a sufficiently positive voltage appears on terminal 174. When MOS transistor 180 is turned off, the voltage level is capacitively stored on the storage node 177, but may gradually degraded by various parasitic effects. N-channel transistor 179 is the read gating transistor, and has its gate electrode connected to read control terminal 173 and its other main electrode connected to read data terminal 172. During the read operation, transistor 179 is turned on by a positive voltage on terminal 173, and the read data terminal 175 is conditionally discharged to ground through the continuous path created by the channel of transistor 179 and the conditional channel of transistor 178, depending upon whether a positive or negative voltage level is stored on storate node 177. Referring to FIG. 2A, all of the N-channel RAM cells in a given row share a common read control bus 183 and a common write control bus 184, the read control bus 183 being connected to all of the read control terminals 173 (FIG. 2B) and the write control bus 184 being connected to all of the write-refresh control terminal 174 (FIG. 2B). The signals for the read control bus 183 and write control bus 184 for a given row are generated by a silicon gate CMOS row select circuit 147. Row select circuit 147 is depicted schematically in FIG. 2G. Referring to both FIGS. 3A and 3G, it is seen that the 3 inputs to row select circuit 189 are the output 233 of the CMOS NAND row decode gate, and internally generated clock 232 designated R, and a delayed internal clock 231, designated R', and generated by upper half-array select circuit 245 (FIG. 2A) for the upper half array. For the lower half array, inputs 231 and 232 are replaced by input 274 designated R', and input 273 designated $\overline{R}$, both of which are generated by lower half-array select circuit 250. CMOS NAND row decode gate outpt 233 is connected to the gate electrode of a P-channel transistor 206 (FIG. 2G) having its source connected to a positive $V_{DD}$ power supply and its drain connected to a main electrode of a P-channel transistor 207 having its gate electrode connected to the R input 232, and its other main electrode connected to read control bus 212. N-channel transistor 208 has its source connected to ground, its drain connected to read control bus 212, and its gate electrode connected in common with the gate electrode of transistor 206. N-channel transistor 209 has its source connected to ground, its drain connected to read control bus 212, and its gate electrode connected to R input 232. N-channel transistor 211 has its source connected to ground, its gate electrode connected in common with the gate electrode of transistor 209, and its drain electrode connected to write-refresh control bus 213. N-channel transistor 210 has its gate electrode connected to R' input 231, a main electrode connected to write-refresh control bus 213, and its other main electrode connected to read control bus 212. Referring to FIG. 2A, all of the RAM cells 133 in a given column share a common write-refresh data bus 186. All of the cells in a given column in the upper half array 171 share a common read data bus 185. Similarly, all of the RAM cells 133 in the lower half array 276 share a separate read data bus. THe write-refresh data bus 186 is connected in common to the write-refresh data terminals 176 of all RAM cells 133 in that column, and the read data bus 185 is connected in common with the read data terminals 175 of all RAM cells in the column within the particular upper or lower half-array. Each column of RAM cells 172 in the upper half array 171 shares a column refresh circuit 137, and each column of RAM cells in the lower half array 276 also shares an identical refresh circuit 137. Each read data bus 185 is connected to a drain electrode of a p-channel precharging transistor 277 having its source electrode connected to the $V_{DD}$ supply and its gate electrode connected to clock input 128. A particular CMOS refresh circuit for refreshing information to the dynamic RAM cells of a single column is described in co-pending U.S. Pat. application, Ser. No. 150,423 entitled, "Circuit for Refreshing Information in Semiconductor Cells of MOS Random Access Memory," filed June 7, 1971 and assigned to the same assignee. FIG. 2D shows another schematic drawing of CMOS refresh circuit 137. The T shown inside the inverter logic symbol represents an internal clock signal generated at terminal 244 of the upper half array select circuit 245 (FIG. 2A), and the T has an analogous function for the lower half array. Referring again to FIG. 2D, the CMOS refresh circuit 137 includes a CMOS inverter comprised of a *p*-channel transistor 202 having a source electrode connected to $V_{DD}$, a drain electrode connected to the drain electrode of an N-channel transistor 203 and also to a main electrode of a P-channel transistor 201, and also having a gate electrode connected to the gate electrode of transistor 203, and forming an input terminal, which for each CMOS refresh circuit 137 is connected to the read data bus 185 for the corresponding column. The gate electrode of transistor 201 is connected to T terminal 244 of the upper half array select circuit 245 for refresh circuits connected to the upper half array 171, and to T terminal 275 of the lower half array select circuit for CMOS refresh circuits connected to the lower half array 276. The other main electrode of transistor 201 forms an output 214 which is connected to write-refresh data bus 186 (FIG. 3A) for the corresponding column. Each write-refresh data bus 186 is connected to a column select amplifier circuit 139 comprising four N-channel transistors. The function of the column select amplifier circuit is to gate input data from the decoded data in bus or to select write-refresh data bus 186, and to amplify output data from the selected storage cell 133 through the write-refresh data bus 186 of the selected column to the decoded data out bus 228. The column select amplifier circuit 139 includes N-channel transistor 252 having its source electrode connected to ground, its gate electrode connected to read data bus 185, and its drain electrode connected to a main electrode of N-channel transistor 254, whose other main electrode is connected to decoded data output bus 228, and whose gate electrode is connected to the gate electrode of N-channel transistor 253 and also to output 268 of a CMOS NOR gate 267. N-channel transistor 251 has a main electrode connected to write-refresh data bus 186, its gate electrode connected to output terminal 258 of CMOS read write inverter 257. The other main electrode of transistor 251 is connected to a main electrode of transistor 253, which has its gate electrode connected to output 268 of NOR gate 267 and its other main electrode connected to decoded data in bus 227. Decoded data bus 228 is connected to a main electrode of an N-channel transistor 265 whose other main electrode is data out terminal 130 and whose gate electrode is chip enable input terminal. Decoded data in bus 227 is connected to a main electrode of N-channel transistor 264 having its gate electrode connected to chip enable input 128 and its other main electrode connected to the output 261 of a CMOS inverter 260 having as its input data in terminal 129. Referring to FIG. 2C, a typical CMOS inverter 260 is schematically represented and comprises a P-channel transistor 291 and N-channel transistor 292. Transistor 291 has its source electrode connected to power supply $V_{DD}$, its drain electrode connected to output 290 and also to the drain of transistor 292, and has its gate terminal connected to input 280 and also to the gate terminal of transistor 292. The source of transistor 292 is connected to ground. Referring back to FIG. 2A, it is seen that the particular row of the upper half-array 171 and the lower half-array 276 is selected by means of the CMOS NAND gate 230 and the CMOS row address inventors 229. The particular half-array is selected by means of the A4 address input 246, the corresponding address inverter 239, and the half-array select circuits 245 and 250. The row address inverters 143 are schematically identical to the CMOS inverter previously discussed in FIG. 2C. The CMOS NAND gates 230 have four inputs 234, and are shown schematically in FIG. 2E, and comprise four N-channel transistors and four P-channel transistors. P-channel devices 280, 281, 282 and 283 are connected in parallel with their sources all connected to the $V_{DD}$ power supply and their drains all connected to output node 233, each having its gate electrode connected to one of the input terminals 234. N-channel devices 285, 286, 287 and 288 all have their main electrodes connected in series and each has its gate electrode connected to one of the input terminals 234. The source terminal of the transistor 288 is connected to ground and a main electrode of transistor 285 is connected to the output node 233. The CMOS column address inverters 149 (FIG. 2A) having inputs 124 corresponding to address input 85, 86, 88 and 89 are schematically identical to the row address inverters 229. The five input CMOS NOR gates 267 select one out of 32 columns, and each provides an output 268 to drive a column select amplifier circuit 139. Referring to FIG. 2F, it is seen that CMOS NOR gates 267 include five P-channel transistors and five N-channel transistors. P-channel transistors 290, 291, 292, 293 and 294 have their main electrodes connected in series, and their gates each connected to one of the inputs 226. The source electrode of transistor 290 is connected to power supply $V_{DD}$, and a main electrode of transistor 294 is connected to output terminal 268. N-channel transistors 295, 296, 297, 298 and 299 are connected in parallel with their source electrodes connected to ground and their drain electrodes connected to output 268, and their gates are each connected to one of the inputs 226. Returning to FIG. 2A, it can be seen that there are 32 CMOS NOR gates 267. The upper half-array select circuit 245 includes two standard CMOS inverters 237 similar to those previously described with respect to FIG. 3C. Also included are three N-channel transistors 241, 242 and 255 and also three P-channel transistors 240, 243 and 247. Transistor 240 has its source electrode connected to the positive supply $V_{DD}$, its gate electrode connected to clock input 126, and its drain electrode connected to a main electrode of N-channel transistor 241, and the drain electrode of P-channel transistor 247. The gate electrode of transistor 241 is also connected to clock input 126, and the other main electrode of transistor 241 is connected to the drain of N-channel transistor 242, which has its source electrode connected to ground and its gate electrode connected to the output of A4 address inverter 239, and also the gate electrode of P-channel transistor 247. The source electrode of transistor 247 is connected to terminal 232, designated R, and is connected to the input of a CMOS inverter 237 whose output is connected to the input of another CMOS inverter 237, whose output is terminal 231, designated R'. The source of transistor 247 is also connected to a main electrode of N-channel transistor 255, whose gate electrode is connected to R/W input 127, and whose other main electrode is connected to terminal 244, designated T. P-channel transistor 243 has its source electrode connected to power supply $V_{DD}$, its gate electrode connected to R/W input 127, and its drain electrode connected to terminal 244. Lower half-array select circuit 250 is identical in configuration to upper half-array select circuit 245. However, its input is address input A4, and its outputs are designated R, R', and $\bar{T}$.

Figure 3:
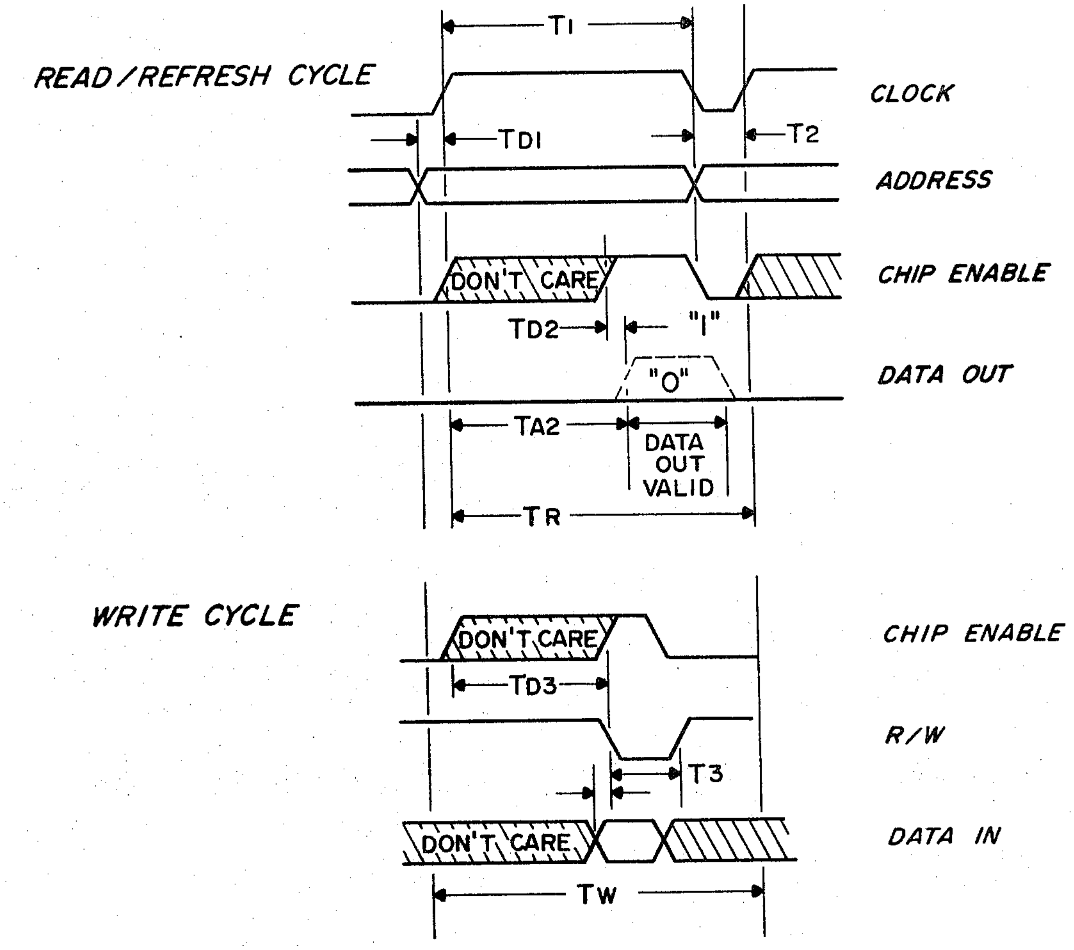
FIG. 3 is a waveform timing diagram for the random access memory system of FIG. 2.

The operation of this embodiment of the 1,024 bit silicon gate CMOS RAM is next described with respect to FIG. 3, which is a timing diagram for a read/refresh memory cycle and a write/memory cycle.

OPERATION OF THE PREFERRED EMBODIMENT

The overall operation of the CMOS dynamic RAM is described with reference to FIG. 3, which shows timing diagrams for read and write cycles for the embodiment shown in FIGS. *2A–2G* memory. To summarize the operation of the memory, the chip is selected by means of a 1 level applied to the chip enable input. One of the 1,024 internal memory cell locations is addressed by means of the voltages applied to the 10 address input voltages, and digital information is read out of the specified location by means of the output circuitry and the data output terminal, or is written into the addressed location by means of the data input terminal and the input circuitry. For dynamic RAM's, it is also necessary to periodically refresh the memory, schematically shown in FIG. 2A. An entire row of RAM cells, the particular one corresponding to the voltage configuration on the row address input terminals $A_0$-$A_3$, is refreshed during a typical read cycle. The subject memory chip has its data input and data output terminals isolated from internal circuitry by means of the chip enable input. The difference between a read cycle and a refresh cycle is that for a refresh cycle the chip is not selected (by a 1 logic level applied to the chip enable input). Internally, a specific RAM cell location is selected by selecting a particular row and a particular column of RAM cells, the particular RAM cell at the intersection thereof being referred to as the selected cell. However, during reading, all 32 RAM cells in the selected row conditionally discharge the corresponding 32 read data busses 185 of FIG. 2A, depending on whether a logic 1 or logic 0 state is stored on the storage node of the specific RAM cell 133. Subsequently, the voltage level on the subject read data bus 185 is then inverted and transferred to the write-refresh data bus 186 for every column in the selected half-array. Only the logic level on the write-refresh data bus 186 for the selected column (determined by the voltage configuration of the column address inputs A5 through A9) is gated to data out terminal 279 by means of the column select amplifier circuit 139. However, the voltage levels on the write-refresh busses 186 of all of the columnS of the selected half-array are transmitted to the storage nodes of all RAM cells of the selected row, thereby refreshing the voltage levels stored thereon. Thus, it is seen that the addressing process for the semiconductor memory chip consists of selecting a row by means of the row address inputs A0 through A3, selecting a column by means of the column address inputs A5 through A9, and selecting an upper or a lower half-array by means of address input A4 thereby uniquely selecting one of the 1024 RAM cells and thereby connecting it to the input-output circuitry. The circuit operation of the preferred embodiment depicted in FIG. 2A is most described, with reference to the timing diagram of FIG. 3, by first considering a read/refresh cycle, and subsequently considering a write cycle.

Figure 2G:
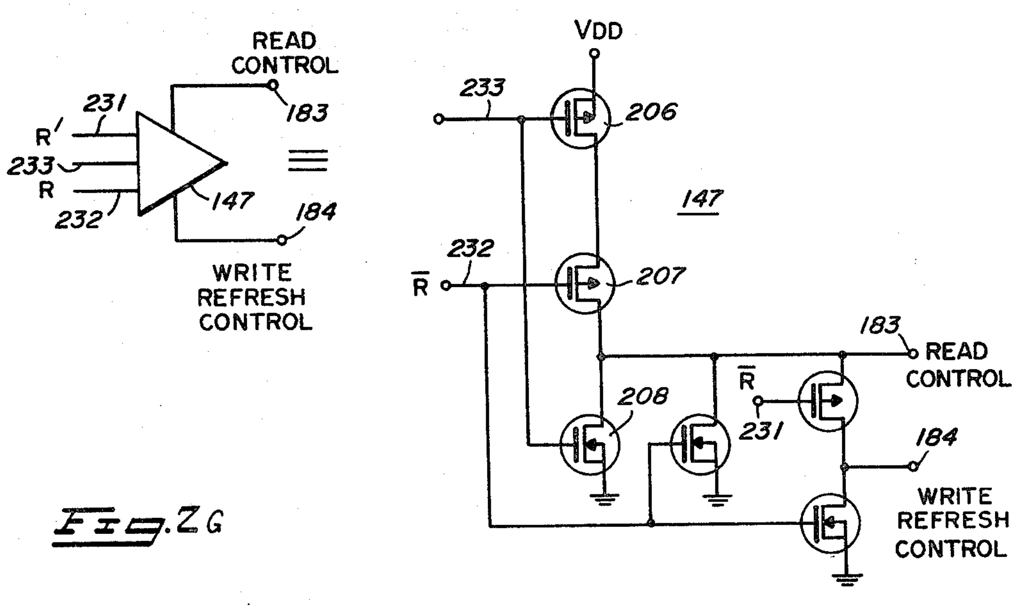
FIG. 2*g* is a schematic diagram of the write-refresh control circuit utilized in the embodiment of FIG. 2*a*.

The first event in a read refresh cycle (or a write cYcle) is the address change, during which the address inputs A0 through A9 undergo transitions to achieve the voltage configuration required to select the desired location of the memory. The address levels, once established, must remain stable during the memory cycle to prevent stored data from being destroyed. Once the address inputs are stable, the next event, which actually initiates the memory cycle, is the transition of the clock input 126 (FIG. 2A) from 0 volts to $+V_{DD}$ volts. This occurs after a time TD1 (FIG. 3) has elapsed. The time TD1 is sufficiently long to allow the row address inverters 143 and the A4 address inverter 239 voltage transitions to stabilize, so that the row NAND decode gates 230 select only one of the 16 rows for each of the upper and lower half-arrays 171 and 276, respectively, prior to the clock input transition. Prior to the transistion of the clock input only the address inverters 143 and the decode gate 230 are selected. Once the clock transition has occurred, each of the 32 read data busses 185 in the upper half-array 171 and also the 32 read data busses 185 and the lower half-array 276 are all precharged to $+V_{DD}$ volts through corresponding p-channel transistors 277. Simultaneously, R and R' (232 and 231, in FIG. 3A, respectively) and also T (244) are being generated by the upper half array select circuit 245, and the voltages $\bar{R}$ and $\bar{R}'$ and $\bar{T}$ (273, 274 and 275) by the lower half-array select circuit 250. For example, if the address input A4 is at $V_{DD}$ volts, address input inverter 239 has its output at 0 volts, and transistor 242 is off, and P-channel transistor 247 is on. Then the capacitance of R, nodes 232, is charged to $+V_{DD}$ volts through transistor 240 and 247. Referring to FIG. 2G, it is seen that if R is at $V_{DD}$ volts, *p*-channel transistor 207 is on, and if the subject row is the one selected by the row address inputs A0 through A3, NAND gate 230 has its output node 233 at 0 volts and P-channel transistor 206 is on, and consequently the capacitance of read control bus 212 is charged to $V_{DD}$ volts, resulting in the selection of the subject row of RAM cells 172 for the upper half-array 171. It will also be noted that transistor 242 of the lower half-array select circuit 250 is on, thereby keeping R (node 273) at 0 volts, preventing selection of the lower half-array 276. Referring back to the upper half-array select circuit 245, it is seen that the voltage of R' (node 231) is derived from the voltage of R and is delayed by the combined delays of complementary inverters 237. This provides the delay between the transitions of read control bus 212 and write-refresh control bus 213. Between these two transitions, the storage cells and the selected row must conditionally discharge the associated read data busses 185. For each of these columns, the refresh circuit 137 inverts the voltage on the corresponding read data bus 185 and gates it through transmission device 201 (FIG. 2D) when the voltage on T undergoes a transition from $V_{DD}$ volts to 0 volts. The voltage transition of T (node 244) is delayed from R, but occurs before the transition of R'. The write-refresh data bus 186 for each column had previously been precharged to 0 volts through N-channel devices 300 by means of $\overline{\text{clock}}$ lines 302, which is the output of clock inverter 301. Consequently, after transition of line T, the voltage level stored on the storage node of each RAM cell 133 and the selected row appears on the corresponding write-refresh data bus 186. Then when R' (node 231) undergoes its transition from 0 to $V_{DD}$ volts, the voltage level stored on the storage node of each of the RAM cells in the selected row is refreshed through N-channel transistor 180 (FIG. 2B) of the corresponding RAM cell, for the selected half-array only. At this point, the stored data in each cell in the selected row appears on the corresponding write-refresh data bus 186. It is the function of the column addressing circuitry to select one of the 32 columns and transmit the stored data and transmit it to data out terminal 130. The write-refresh data bus voltage level is inverted and transmitted to the decoded data out bus 228 by means of N-channel transistors 252 and 254 for the selected column only. It should be appreciated that the CMOS NOR column decode gates 267 and the column address inverters 149 may have a combined delay time somewhat longer than that for the corresponding row address circuits, since the column does not have to be selected until the RAM cells 133 have been sensed and data has been transmitted to the write data busses 186. Once the column has been selected, and if the chip enable input 263 is at $V_{DD}$ volts, an output current representing the voltage on the storage node of the selected RAM cell will flow through the data out terminal 130 through N-channel transistors 265, 254 and 252. It should be appreciated that it is not necessary for the chip to be selected by chip enable input 263 for the RAM cells in the selected row to be refreshed, since this occurs independently of chip enable input 128, as is seen in the timing diagram of FIG. 3, wherein the chip enable input is in a "dont't care" condition until late in the read/refresh cycle.

During a write cycle, the voltage on the data in terminal 129 is complemented and gated through N-channel transistor 264 to the decoded data in bus 227 if chip enable input 128 is at $V_{DD}$ volts, and is gated through transistor 253 of the selected column and then through transistor 251 (which is turned on by the complement of the read/write input 127) to the write-refresh data bus 186 of the selected column. This operation must occur after all cells in the selected row have been refreshed by the respective feedback circuit 200. At that time the read/write input 127 goes from $V_{DD}$ volts to 0 volts, causing line T (node 244) to go to $V_{DD}$ volts, thereby turning on the P-channel transmission transistor 201 of refresh circuit 137 (FIG. 2D), thereby isolating all of the write-refresh data busses 186 from the respective feedback refresh circuits 127. Thus, the data in voltage levels being transmitted through the column select amplifier circuit do not have to over-ride the feedback refresh circuit 137 of the selected column, and the voltage is written into the storage node of the selected RAM cell.

While the invention has been shown in connection with certain specific examples, it will readily apparent to those skilled in the art that various changes in form and arrangement of parts may be made to suit the requirements without departing from the spirit and scope of the present invention.

We claim:

1. A monolithic random access memory array capable of accepting digital data in the form of electronic impulses from an outside data source, having a plurality of dynamic silicon gate MOS storage cells arranged in $2^M$ rows and $2^N$ columns, each cell being provided with selective input means, responsive to a relatively low or relatively high voltage level, arbitrarily indicative, respectively, of a binary 1 a binary 0 and each cell being provided with output means for indicating its binary data content, each cell being connected to column precharge means, the improvement comprising:

a. row addressing means; comprised of silicon gate CMOS circuitry operatively connected to the input means of each cell for selecting one row of storage cells;

b. column addressing means comprised of silicon gate CMOS circuitry operatively connected to the input means of each cell for selecting one column of cells, the cell proximate to the intersection of the row of selected cells and the column of selected cells being uniquely selected;

c. data means, comprised of silicon gate CMOS circuitry operatively connected to the input means and to the output means of each cell for supplying a binary "1" or a binary "0" to the uniquely selected cell selectively from the outside data source or from the output means of the cell; and d. feedback refreshing means, comprised of silicon gate CMOS circuitry operatively connected to the data means, for refreshing the binary contents of each cell as controlled by the binary data content of the data means; and e. all said field effect transistors have threshold voltages of less than 1 volt, wherein no diffused guard rings are utilized to block parasitic current paths, wherein no diffused guard rings are utilized to block parasitic current paths, and wherein all field effect transistors have threshold voltages of less than 1 volt.

2. The monolithic memory array of claim 1 further comprising internal clocking means for developing timing signals, operatively connected to at least the column precharge means and the feedback refreshing means, for controlling the internal timing of the monolithic memory array.

3. The monolithic array of claim 2 wherein the row addressing means include:

a. i. address inverting buffer means, comprised of CMOS circuitry, for providing internal address and address complement voltages from M row address input terminals;

ii. row decoding means, comprising CMOS decode gates, bussing means for transmitting address and address complement signals from the address inverting buffer means to inputs of the CMOS decode gates, whereby each unique voltage configuration of the M row address inputs causes selection of only one of the $2^M$ rows;

iii. control bussing means, comprising at least one separate control bus for each row in the memory array operatively connected to each dynamic MOS storage cell in that row, and;

iv. row selection means comprised of CMOS circuitry, wherein outputs of the row decoding means are operatively connected to the row selection means, causing the control bussing means of the selected row to be operatively connected to the internal clock means.

4. The monolithic memory array of claim 2 wherein the column decoding means include a CMOS decoding tree.

5. The monolithic memory array of claim 2 wherein the column decoding means and the row decoding include CMOS decoding trees.

6. The monolithic memory array of claim 2 wherein the data means include:

c. i. data bussing means, comprising at least one separate data bus for each column in the memory array operatively connected to each storage cell in the subject column, for transmitting binary data to and from the storage cell in the row selected by the row addressing means;

ii. column precharge means, comprised of CMOS circuitry for establishing an approriate voltage level on the data bussing menas prior to read, write, and refresh operations;

iii. decoded column bussing means for transmitting binary data to and from the uniquely selected storage cell via the data bussing means;

iv. column selection and amplifying means, comprised of CMOS circuitry, for selecting one of the $2^N$ columns to allow binary data to be efficiently transmitted between the data bussing means and the decoded column bussing means, and;

v. gated data input-output buffer means, comprised of CMOS circuitry, having at least one terminal, connecting the decoded column bussing means to a data terminal when a chip enable input terminal is a logical "1" level, and disconnecting the decoded column bussing means from the data terminal when the chip enable input is at a logical "0," for amplifying output data from the decoded column bussing means to a data terminal receiving output data, and for efficiently transmitting input data from an input data terminal to the decoded column bussing means.

7. The monolithic memory of claim 6 wherein the column addressing means include:

b. i. address inverting buffer means, comprised of CMOS circuitry, for providing internal address and address complement voltages from N column address input terminals;

ii. column decoding means, comprised of column CMOS decode gates and CMOS circuitry, having bussing means for transmitting address and address complement voltages from the column address inverting buffer means to inputs of the column CMOS decode gates, and having the outputs of the column CMOS decode gates operatively connected to the column selection and amplifying means, whereby each unique voltage configuration of the N-column address input terminals causes selection of only one of the $2^N$ columns.

8. The monolithic memory array of claim 7 wherein each column has separate feedback refreshing means comprising at least one inverting circuit operatively connected to the data bussing means for receiving a voltage level representing the binary data stored in the storage cell of the selected row for the subject column, and for amplifying the voltage level representing the binary data, and for transmitting amplified binary data, in functional timing sequence, to the data input means for transmission to a storage node of the subject storage cell, thereby refreshing the storage node.

9. The monolithic memory array of claim 8, wherein the dynamic MOS storage cell comprises:

a. a first N-channel MOS storage transistor having source and drain electrodes, and gate electrode for storing binary data represented by a relatively high or low voltage level;

b. a second N-channel MOS read gating transistor having a source electrode connected to the drain electrode of the first MOS storage transistor, a drain electrode connected to a read data bussing line, and a gate electrode connected to a read control bussing line;

c. a third N-channel MOS write-refresh gating transistor having a source electrode connected to the gate electrode of the first MOS storage transistor, a drain electrode connected to a write-refresh data bussing line, and a gate electrode connected to a write-refresh control bussing line.

10. The monolithic memory array of claim 9 wherein the internal clocking means comprises:

a. a clock bus operatively connected to a clock input terminal and to the data precharge means;

b. an upper-half array select circuit having the clock bus as an input, and having as another input an output of a CMOS inverter having as its input a half-array selection address input terminal, the upper half-array select circuit having as outputs an upper-half-array select clock, a delayed upper-half-array select clock, and an upper-half-array refresh amplifier gating clock, and;

c. a lower-half-array select circuit having the clock bus as an input, and having as another input the half-array selection address input terminal, the lower half-array select circuit having as outputs a lower-half-array select clock, a delayed lower-half-array select clock, and a lower-half-array refresh amplifier gating clock.

11. The monolithic memory array of claim 10 wherein:

a. the new address inverting buffer means comprises M row address CMOS inverters each comprising one P-channel transistor and one N-channel transistor, each CMOS inverter having an input connected to a row address input terminal and an output connected to a row address complement bus;

b. the row decoding means comprises $2^M$ CMOS NAND gates each comprising M P-channel transistors in parallel connection and M N-channel transistors in series connection, and also having M input terminals each connected to row address input busses and row address complement busses in such manner that each unique voltage configuration of the M row address inputs causes selection of one and only one of the $2^M$ NAND gates;

c. the control bussing means comprises $2^M$ read control busses each operatively connected to the gate electrode of the read gating device of each MOS storage cell of the subject row, and $2^M$ write-refresh control busses each operatively connected to the gate of the write-refresh transistor of each MOS memory cell in the subject row, and;

d. the row selection means comprises a separate row select circuit for each row in the upper-half-array and one for each row in the lower-half-array, each upper-half-array row select circuit having connected to one input the output of one of the CMOS NAND decode gates and having connected to a second input having internally derived upper-half-array select clock, and having connected to a third input an internally derived delayed upper-half-array select clock, and having as a first output a read control bus and having as a second output a write-refresh control bus, both operatively connected to one row of the upper-half-array, and each lower-half-array row select circuit having connected to one input the output of one of the CMOS NAND decode gates and having connected to a second input an internally derived lower-half-array select clock, and having connected to a third input an internally derived delayed lower-half-array select clock, and having as a first output a read control bus and having as a second output a write-refresh control bus, both operatively connected to one row of the lower-half-array, each row select circuit comprising a first P-channel transistor, a second P-channel, and a third N-channel transistor in series connection between a $V_{DD}$ supply bus and a $V_{SS}$ supply bus, the first and third transistors having their gate electrodes operatively connected to one of the CMOS NAND decode gate outputs, and the second transistor having its gate output electrode operatively connected to the internally derived upper-half-array select clock.

12. The monolithic memory array of claim 11 wherein:

a. the data bussing means comprise one separate write-refresh bus for each entire column of MOS storage cells operatively connected to the write-refresh terminal of each MOS storage cell, and a read bus operatively connected to the read terminal of each MOS storage cell of the subject column in the upper half of the storage array and also operatively connected to a refresh amplifier, and a lower read bus operatively connected to the main terminal of each MOS storage cell in the subject column and the lower half of the array and operatively connected to a lower refresh amplifier;

b. the column precharge means comprise a separate P-channel transistor operatively connecting each lower read bus to the $V_{DD}$ supply bus and operatively connecting each upper read bus to the $V_{DD}$ supply bus, and having a precharge clock connected to a gate electrode of said P-channel transistor, and a CMOS inverter having the precharge clock as an input, said CMOS inverter having its output connected to a gate electrode of an N-channel transistor which operatively connects each write-refresh data bus to the $V_{SS}$ supply bus;

c. the decoded column bussing means comprises a separate data in bus for transmitting binary data to the uniquely selected column from an input-output buffer circuit and a separate data out complement bus for transmitting binary data from the uniquely selected column to an input-output buffer circuit;

d. the column selection and amplifying means comprise a separate 4-transistor CMOS circuit for each column, each circuit having N-channel gating devices with gate terminals connected to the output of a CMOS NOR decode gate, and having an internally generated write enable input operatively connected to the gate electrode of another N-channel transistor, each column selection and amplifying circuit operatively connected to the data in bus and the data out complement bus, and;

e. the gated data input-output buffer means comprise a CMOS inverter having a data in terminal as its input and having its output gated to a data input bus by an N-channel transistor having its gate electrode connected to a chip enable input terminal and a data out complement terminal gated via the data out complement bus to a data out complement output terminal by an N-channel transistor having its gate connected to the chip enable input terminal.

13. The monolithic memory of claim 12 wherein:

a. the column address inverting buffer means comprise a separate CMOS inverter for each column address input;

b. the column decoding means comprise a separate CMOS NOR gate for each column of the storage array, each NOR gate including N P-channel transistors in series connection and N N-channel transistors in parallel connection, and having N inputs, each of the inputs operatively connected to CMOS address inverter outputs and column address inputs whereby each unique voltage configuration of the N address input terminals causes selection of only one of the $2^N$ NOR gates, the output of each NOR gate being connected to a column selection and amplifying circuit.

14. The monolithic memory of claim 13 wherein the feedback refreshing means comprise:

a. an upper refresh amplifier and a lower refresh amplifier for each column, each having identical circuit configuration, each having an output terminal operatively connected to the write-refresh bus of a column, and each refresh amplifier having an input connected, respectively, to the upper read bus and the lower read bus of a column, and each upper refresh amplifier being gated by the upper-half-array refresh amplifier gating clock, and each lower refresh amplifier being gated by the lower-half-array refresh amplifier gating clock;

b. each refresh amplifier includes a standard CMOS inverter comprised of a P-channel transistor and an N-channel transistor in series connection, with their common drain electrodes connected to a main electrode of a gating transistor, the refresh amplifier having as an input the connected gate electrodes of the series connected transistors, and having as a clock input the gate electrode of the gating transistor, and having as an output the other main electrode of the gating transistor.

* * * * *